(12) United States Patent
Lowmaster

(10) Patent No.: US 6,488,255 B2
(45) Date of Patent: Dec. 3, 2002

(54) APPARATUS FOR TILTING A LAWNMOWER

(76) Inventor: Gary K. Lowmaster, 3904 Wolke Dr., Richmond, IN (US) 47674-4425

( * ) Notice: Subject to any disclaimer, the term of this patent is extended or adjusted under 35 U.S.C. 154(b) by 0 days.

(21) Appl. No.: 09/910,379

(22) Filed: Jul. 20, 2001

(65) Prior Publication Data

US 2002/0008186 A1 Jan. 24, 2002

Related U.S. Application Data

(60) Provisional application No. 60/220,280, filed on Jul. 24, 2000.

(51) Int. Cl.$^7$ ............................................... F16M 13/00
(52) U.S. Cl. ..................... 248/545; 248/176.1; 248/680
(58) Field of Search ................................. 248/544, 545, 248/156, 176.1, 673, 676, 680; 269/17, 69, 71, 88, 296; 254/134

(56) References Cited

U.S. PATENT DOCUMENTS

| | | | | |
|---|---|---|---|---|
| 3,195,898 A | * | 7/1965 | Respini | 248/156 X |
| 3,341,157 A | * | 9/1967 | Duncan | 248/156 |
| 5,632,475 A | * | 5/1997 | McCanse | 254/134 X |
| 5,697,597 A | * | 12/1997 | Goodbold | 254/134 X |

* cited by examiner

*Primary Examiner*—Ramon O. Ramirez

(57) ABSTRACT

A device for positioning a lawnmower such that the undercarriage may be accessed for maintenance and/or repair includes a stabilizer for insertion into the ground and a retainer connected to the stabilizer for holding the lawnmower handle adjacent the ground, thereby tilting the lawnmower relative to the ground such that the undercarriage is accessible. The device may further include a handle connected to the stabilizer for inserting the stabilizer into and removing the stabilizer from the ground. The handle may be connected to an extender to reduce the amount of bending required of the user when inserting the device into and removing the device from the ground.

30 Claims, 4 Drawing Sheets

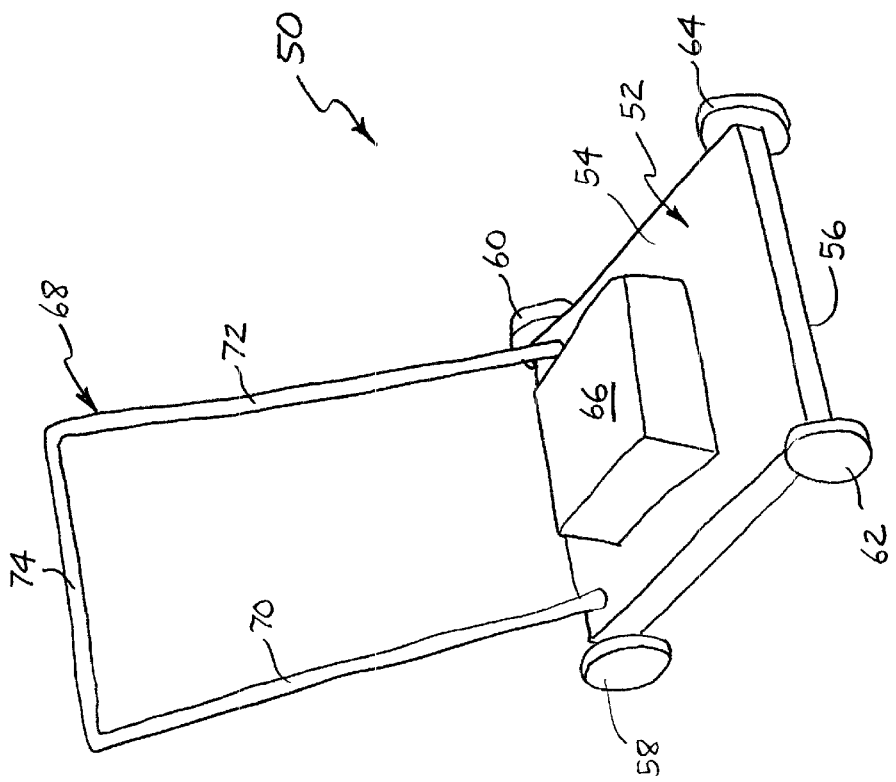
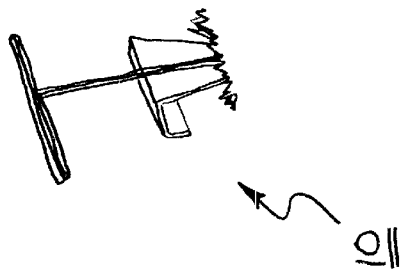
FIG. 5

APPARATUS FOR TILTING A LAWNMOWER

CROSS-REFERENCE TO RELATED APPLICATION

This application claims the benefit of U.S. Provisional Application Ser. No. 60/220,280, filed on Jul. 24, 2000, which is expressly incorporated by reference herein.

FIELD OF INVENTION

The present invention generally relates to lawnmower maintenance and repair, and more specifically to a device for tilting a walk-behind lawnmower relative to the ground such that the undercarriage may be accessed for maintenance and/or repair.

BACKGROUND OF THE INVENTION

It is well known that a properly maintained lawnmower lasts longer and performs more efficiently. One difficulty with maintaining walk-behind lawnmowers is accessing the lawnmower undercarriage to remove grass clippings, lubricate the blade drive mechanisms, and sharpen or replace the blades. Typically, this is a two-person task. One person must hold the handle of the lawnmower near the ground, thereby tilting the lawnmower backward on its rear wheels. The other person then performs the necessary maintenance and/or repair. This approach is undesirable because two people are required, and further because the person holding the lawnmower handle may accidentally release the handle and drop the lawnmower.

Alternatively, some lawnmower owners tilt their lawnmowers sideways on the ground to access the undercarriage. This approach is also undesirable because lawnmowers are generally not designed to lay on their sides. Engine fluids may spill or enter areas of the engine where the fluids may damage or affect the operation of the lawnmower.

SUMMARY OF THE INVENTION

The present invention provides a device for permitting one person to safely position a lawnmower such that the undercarriage may be accessed for maintenance and/or repair. In one embodiment, the device includes a stabilizer for insertion into the ground and a retainer connected to the stabilizer for receiving the lawnmower handle and holding it adjacent the ground, thereby tilting the lawnmower onto its rear wheels such that the undercarriage is accessible. The device may further include a handle connected to the stabilizer for inserting and removing the stabilizer. The handle may be located at the end of an elongated extender connected to the stabilizer so that less bending is required when inserting the device into, or removing the device from the ground.

The features and advantages of the present invention described above, as well as additional features and advantages, will be readily apparent to those skilled in the art upon reference to the following description and the accompanying drawings.

BRIEF DESCRIPTION OF THE DRAWINGS

FIG. 3 is a perspective view of a conventional walk-behind lawnmower and a device according to the present invention.

DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention.

Figure 1:
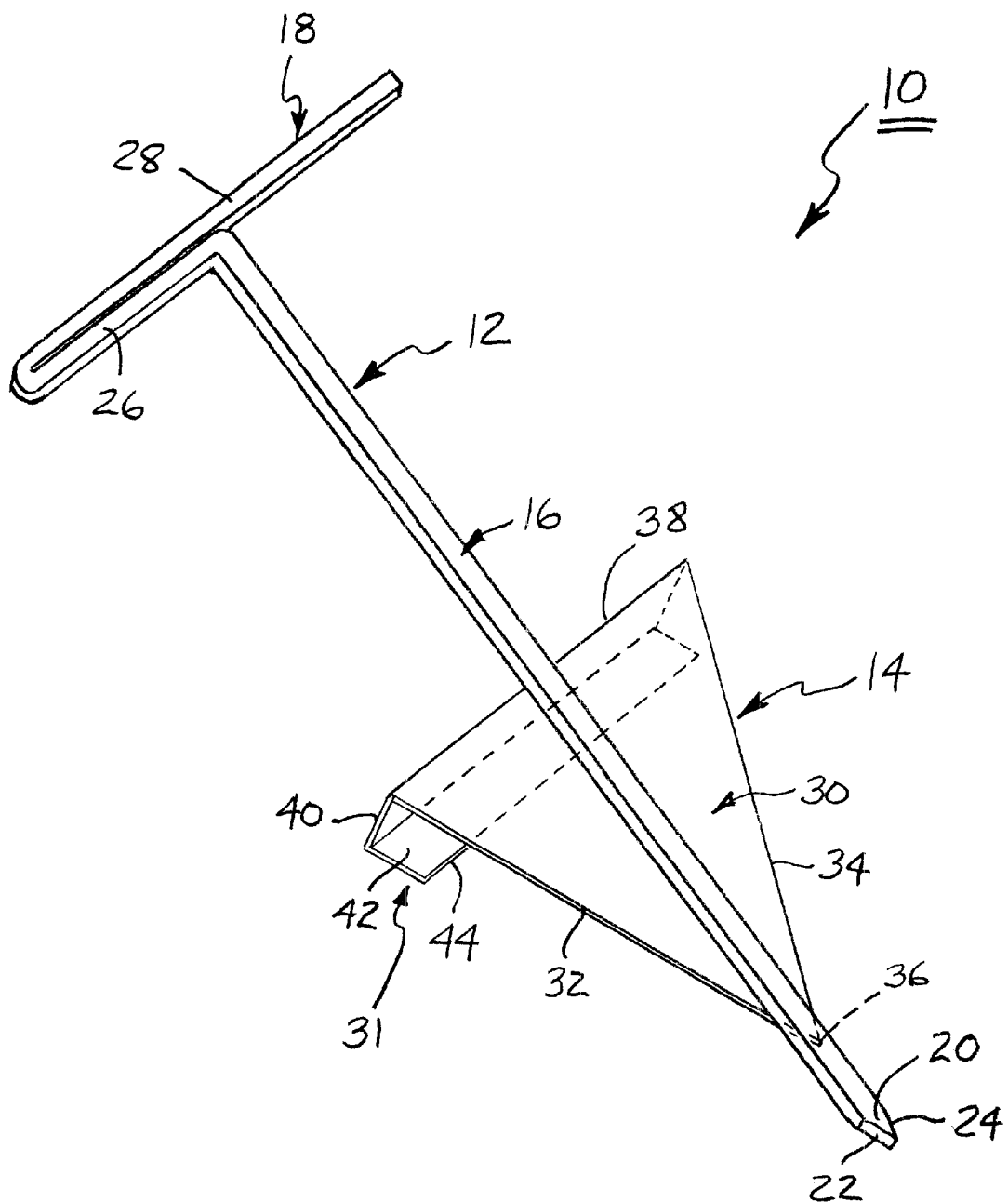
FIG. 1 is a perspective view of a device according to the present invention.
Figure 2:
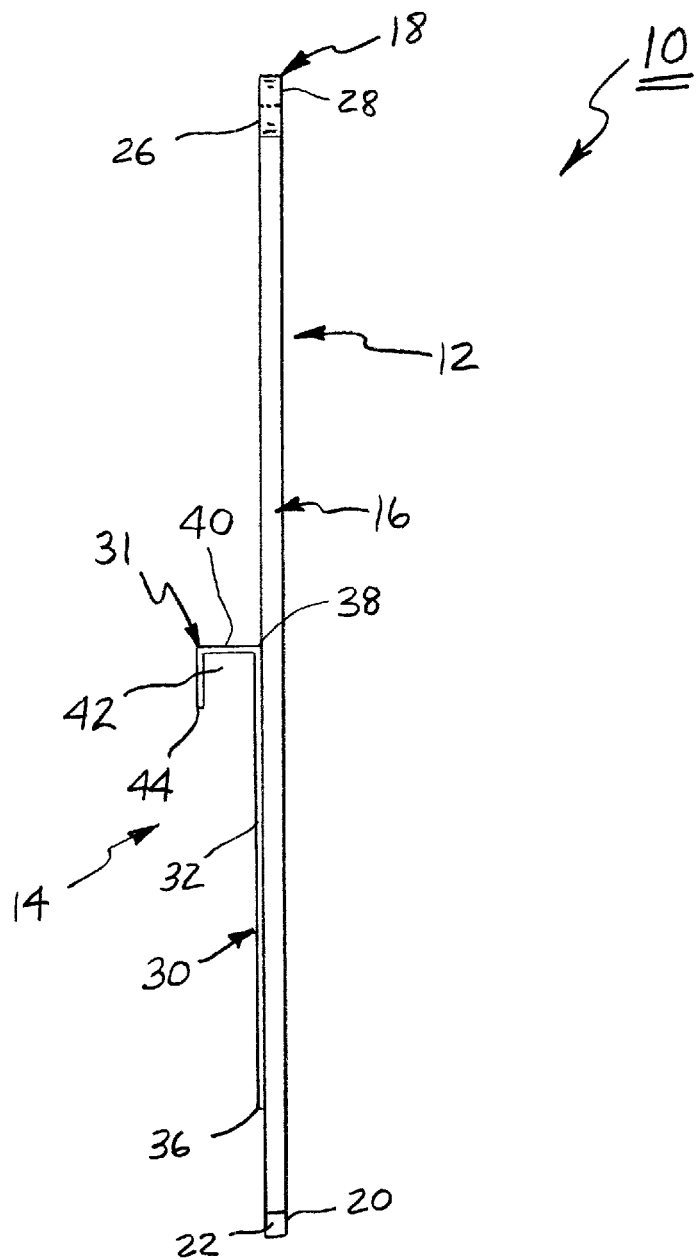
FIG. 2 is a side elevational view of the device shown in FIG. 1.

Referring now to FIGS. 1 and 2, a device 10 according to the present invention generally includes a body assembly 12 and a stabilizer assembly 14. Body assembly 12 includes an extender 16 in the form of an elongated rod having a length that is greater than its width, and a handle 18. One end of extender 16 includes a tip 20 formed by a pair of side surfaces 22, 24 that taper or converge toward one another to form a wedge. Handle 18 is disposed at the other end of extender 16. In the embodiment shown, handle 18 and extender 16 are formed from a single piece of material, for example, a straight, square cross-section 5/16" or 3/8" iron rod that is approximately 36" long. A first portion 26 of handle 18 is bent at a right angle relative to extender 16, and a second portion 28 is bent back onto first portion 26 to form a "T" shape with extender 16. In one embodiment of the invention, handle 18 may thus be formed to result in an 8" handle 18, leaving a 24" extender 16 (i.e., a 36" long extender 16 bent such that first portion 26 is 4" long and second portion 28 is 8" long).

It should be understood that extender 16 and handle 18 may alternatively be formed from a variety of materials such as plastics, fiberglass, metals, or other durable materials, and that the dimensions of extender 16 and handle 18 may vary substantially from those described above. Indeed, extender 16 and handle 18 are optional components of device 10 which simply make insertion and removal of device 10 easier for the user. Assuming extender 16 and handle 18 are used, handle 18 may include only first portion 26, or be formed into a loop or other shape, or even consist of a standard, plastic implement handle such as used on shovels or rakes. Accordingly, handle 18 may be a separate piece that is attached to extender 16 such as by brazing, screws, or other conventional attachment method. In fact, handle 18 may simply consist of an enlarged diameter portion of extender 16 that enables a user to grip handle 18 and apply downward or upward force when inserting device 10 into or removing device 10 from the ground as further described below.

Stabilizer assembly 14 generally includes a stabilizer 30 and a retainer 31. Stabilizer 30 is formed from a substantially flat piece of material such as 1/8" flat iron, and has a triangular shape. Stabilizer 30 includes a pair of side edges 32, 34, a tip 36, and an upper edge 38. As shown, side edges taper or converge with distance from upper edge 38 toward tip 36. In one embodiment of the invention, stabilizer 30 forms an isosceles triangle having a 7" wide base (at upper edge 38) with a central axis (from the midpoint of upper edge 38 to tip 36) that is 13" in length. It should be understood that stabilizer 30 may be formed into a variety of shapes such as trapezoidal or semicircular. For example, side edges 32, 34 may curve toward one another with distance from upper edge 38. Protrusions may extend from stabilizer 30 to enhance the ability of stabilizer 30 to remain in the ground when inserted. Alternatively, stabilizer 30 may consist of a plurality of prongs extending from upper edge 38.

In one embodiment of the invention, retainer 31 depends from upper edge 38 of stabilizer 30, and extends substantially the entire width of upper edge 38. Retainer 31 includes a first portion 40 which is bent at upper edge 38 of stabilizer 30, and a second portion 44 which depends from first portion 40. As best shown in FIG. 2, first portion 40 is substantially perpendicular to stabilizer 30, and second portion 44 is substantially perpendicular to first portion 40. Together, stabilizer 30 and first and second portions 40, 44 of retainer 31 form a recess or channel 42 for receiving the handle of the lawnmower as further described below. It should be apparent from the foregoing that in the embodiment of stabilizer assembly 14 described, stabilizer 30 and retainer 31 are formed from a single piece of material, connected at upper edge 38. In variations of the invention, retainer 31 may be a separate piece, attached to stabilizer 30 using any of a variety of conventional attachment techniques at locations other than at upper edge 38. Retainer 31 need not extend the entire width of upper edge 38, or may extend beyond upper edge 38. Retainer 31 may include segments that form channel 42, instead of consisting of a continuous piece of material. Additionally, channel 42 need not have a substantially rectangular cross-section, but instead may be curved or otherwise shaped to receive the lawnmower handle. Any and all of these variations, as well as the above-described variations of body assembly 12, are well within the scope of the present invention and the ability of a skilled artisan.

As best shown in FIG. 1, body assembly 12 is attached to stabilizer assembly 14 by welding or otherwise securing extender 16 to stabilizer 30 along the central axis of stabilizer 30. Body assembly 12 is attached such that extender tip 20 extends beyond stabilizer tip 36. Thus, extender tip 20 pierces the ground before stabilizer tip 36. It should be understood that extender 16 may be attached to stabilizer 30 such that tip 20 extends any desired distance beyond stabilizer tip 36, including no distance at all. It should be further understood that body assembly 12 and stabilizer assembly 14 may be formed from a single piece of material, such as a molded piece of plastic or other durable material.

Referring now to FIG. 3, device 10 is shown inserted into the ground adjacent a conventional walk-behind lawnmower 50. Lawnmower 50 includes a carriage 52 having an upper side 54 and a lower side or undercarriage 56. Four wheels 58, 60, 62, 64 are connected to carriage 52 in a conventional manner. Carriage 52 carries an engine 66 and is moved about on the ground by pushing and pulling a handle 68. Handle 68 typically includes a pair of uprights 70, 72, each connected at one end to carriage 52 and at the other end to a crossbar 74.

Figure 4A:
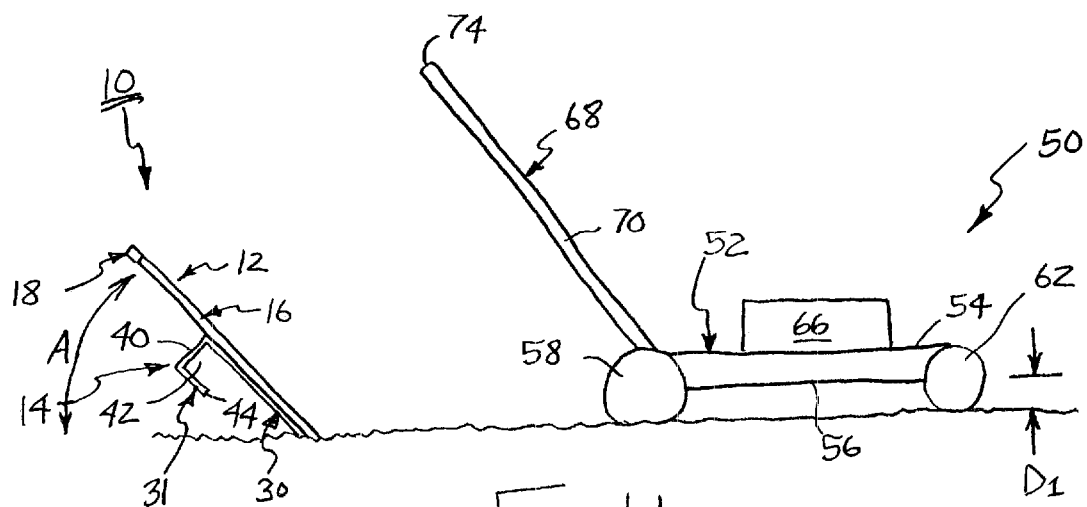
FIGS. 4A–C are side elevational views depicting a use of the device according to the present invention.
Figure 4B:
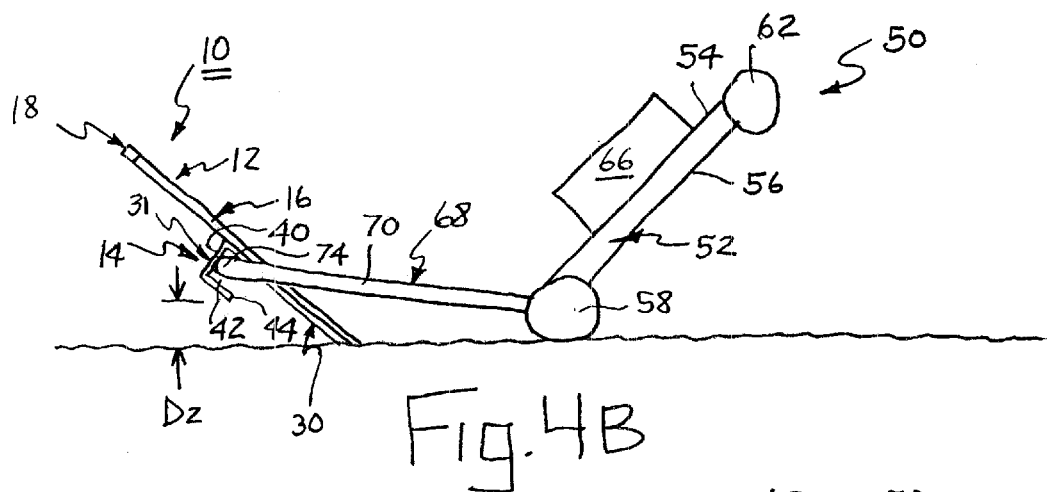
Figure 4C:
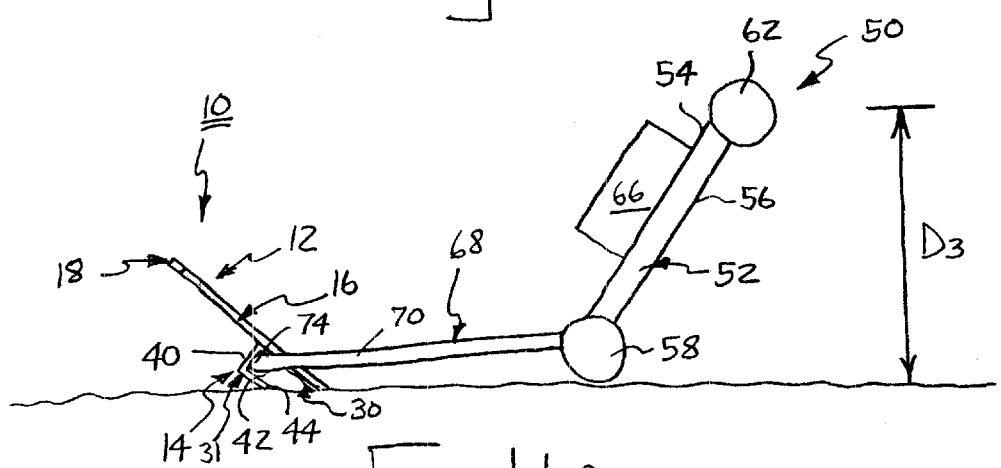

FIGS. 4A–C depict the method of using device 10 for positioning lawnmower 50 such that undercarriage 56 is accessible by the user for maintenance and/or repair. As shown, undercarriage 56 is initially spaced a distance $D_1$ from the ground such that it is inaccessible by the user. Referring to FIG. 4A, device 10 is first inserted into the ground at an angle "A" which may be approximately 70 to 75 degrees. As will be further understood by reading the following description of operation of device 10, angle "A" of insertion of device 10 improves the ability of stabilizer 30 to remain in the ground and assists in preventing inadvertent upward movement of lawnmower handle 68. The user inserts device 10 by pressing downwardly with a foot on first portion 40 of retainer 31, by pressing downwardly with a hand on handle 18, or a combination of the two. It should be noted that when device 10 is initially inserted into the ground as shown in FIGS. 4A and 4B, the lower edge of retainer second portion 44 is spaced a distance $D_2$ from the ground. Distance $D_2$ should be large enough to receive crossbar 74 of lawnmower handle 68.

As shown in FIG. 4B, lawnmower 50 is next backed up toward device 10. The user grasps handle 68 of lawnmower 50 and urges it downwardly, tilting lawnmower 50 back onto wheels 58, 60 (only one shown). Crossbar 74 of handle 68 is then positioned under retainer 31 and into channel 42. Upward movement of handle 68 which would normally result from the weight of carriage 52 (and engine 66) is thus prevented as crossbar 74 is retained by retainer 31. Finally, the user drives device 10 further downwardly such that a greater area of stabilizer 30 is submerged into the ground, thereby further resisting upward movement of device 10. Typically, device 10 is driven downwardly until the lower edge of retainer second portion 44 engages the ground as shown in FIG. 4C. When so positioned, the upper portion of undercarriage 56 is spaced a distance $D_3$ from the ground to permit easy access for maintenance and/or repair. Additionally, crossbar 74 of lawnmower handle 68 is captured by channel 42 and the ground. This prevents the user from inadvertently removing handle 68 from channel 42 by applying upward force to undercarriage 56 during maintenance and/or repair.

When the user is finished maintaining and/or repairing lawnmower 50, the above-described procedure is reversed. Specifically, the user pulls slightly upwardly on handle 18 of device 10 until second portion 44 of retainer 31 is spaced away from the ground as shown in FIG. 4B. The user next grasps handle 68 of lawnmower 50, lowers crossbar 74 out of channel 42, backs crossbar 74 out from under device 10, and lowers lawnmower 50 onto all four wheels 58, 60, 62, 64. Finally, the user pulls upwardly on handle 18 of device 10 to remove the device from the ground. Device 10 may then be cleaned and stored.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

What is claimed is:

1. A device for positioning a lawnmower having an undercarriage and a handle such that the undercarriage may be accessed, including:
    a stabilizer for insertion into the ground into an in-use position; and
    a retainer connected to the stabilizer, the retainer being positioned to define a space above the ground to receive the lawnmower handle such that the retainer holds the lawnmower handle adjacent the ground when the stabilizer is in the in-use position, the device thereby tilting the lawnmower relative to the ground such that the undercarriage is accessible.

2. The device of claim 1 wherein the retainer depends from one end of the stabilizer.

3. The device of claim 2 wherein the stabilizer tapers in width with distance from the one end.

4. The device of claim 2 wherein the stabilizer includes a body having an upper edge at the one end, a tip at another end, and a pair of side edges extending between the upper edge and the tip, the upper edge having a dimension that is greater than the dimension of the tip.

5. The device of claim 4 wherein the retainer depends from the upper edge of the stabilizer and has a width that is substantially equal to the upper edge dimension.

6. The device of claim 4 wherein the side edges converge with distance from the upper edge toward the tip.

7. The device of claim 1 wherein the retainer and the stabilizer are formed from a single piece of material.

8. The device of claim 1 wherein the retainer includes a first portion connected to the stabilizer and a second portion depending from the first portion that cooperates with the first portion and the stabilizer to form a recess for receiving the lawnmower handle.

9. The device of claim 8 wherein the first portion is substantially perpendicular to the stabilizer.

10. The device of claim 9 wherein the second portion is substantially perpendicular to the first portion.

11. The device of claim 1 further including a handle connected to the stabilizer for removing the stabilizer from the ground.

12. A device for positioning a lawnmower having an undercarriage and a handle such that the undercarriage may be accessed, including:

a stabilizer for insertion into the ground;

a retainer connected to the stabilizer for holding the lawnmower handle adjacent the ground, thereby tilting the lawnmower relative to the ground such that the undercarriage is accessible;

a handle connected to the stabilizer for removing the stabilizer from the ground; and an extender connected between the handle and the stabilizer.

13. The device of claim 12 wherein the extender is an elongated rod.

14. The device of claim 12 wherein the handle and the extender are formed from one piece of material.

15. The device of claim 12 wherein the handle is substantially perpendicular to the extender.

16. The device of claim 12 wherein the extender includes a tip for piercing the ground.

17. The device of claim 16 wherein the tip is spaced away from the stabilizer.

18. A device for pinning a lawnmower handle adjacent the ground to tilt the lawnmower, thereby providing access to the lawnmower undercarriage, including:

a retainer formed to overlay the lawnmower handle to prevent upward movement of the handle; and a stabilizer connected to the retainer for insertion into the ground into an in-use position wherein the retainer is positioned to define a space above the ground that receives the lawnmower handle.

19. The device of claim 18 wherein the retainer extends at an angle from the stabilizer.

20. The device of claim 18 wherein the stabilizer includes a triangular body having an upper edge and a tip.

21. The device of claim 20 wherein the retainer extends from the stabilizer along substantially the entire length of the upper edge.

22. The device of claim 18 wherein the retainer includes a first portion and a second portion which form a channel with the stabilizer for receiving the lawnmower handle.

23. The device of claim 18 further including an extender attached to the stabilizer having a handle for removing the stabilizer from the ground.

24. The device of claim 23 wherein the extender includes a tip disposed adjacent the stabilizer tip for piercing the ground to facilitate entry of the stabilizer into the ground.

25. The device of claim 23 wherein the extender is longer than it is wide.

26. A device for tilting a lawnmower having a handle and an undercarriage to permit access to the undercarriage, including:

means for retaining the lawnmower handle adjacent the ground;

means for stabilizing the retaining means relative to the ground;

handle means for moving the stabilizing means relative to the ground; and means for extending the handle means from the stabilizing means.

27. A device for positioning a lawnmower having an undercarriage and a handle such that the undercarriage may be accessed, including:

a stabilizer for insertion into the ground in an insertion direction;

a retainer connected to the stabilizer for holding the lawnmower handle adjacent the ground, thereby tilting the lawnmower relative to the ground such that the undercarriage is accessible; and a handle connected to the stabilizer for removing the stabilizer from the ground, the handle including a portion that extends laterally with respect to the insertion direction to permit grasping of the handle.

28. A device for positioning a lawnmower having an undercarriage and a handle such that the undercarriage may be accessed, including:

a stabilizer for insertion into the ground into an in-use position; and a retainer connected to the stabilizer, the retainer being positioned adjacent the ground for holding the lawnmower handle adjacent the ground when the stabilizer is in the in-use position, the device thereby tilting the lawnmower relative to the ground such that the undercarriage is accessible.

29. A device for pinning a lawnmower handle adjacent the ground to tilt the lawnmower, thereby providing access to the lawnmower undercarriage, including:

a retainer formed to overlay the lawnmower handle to prevent upward movement of the handle; and a stabilizer connected to the retainer for insertion into the ground into an in-use position wherein the retainer is positioned adjacent the ground.

30. A method for positioning a lawnmower having an undercarriage and a handle such that the undercarriage may be accessed, including the steps of:

inserting a stabilizer into the ground;

tilting the lawnmower such that the lawnmower handle is adjacent the stabilizer;

positioning the lawnmower handle under a retainer connected to the stabilizer.

* * * * *